Figure 1:
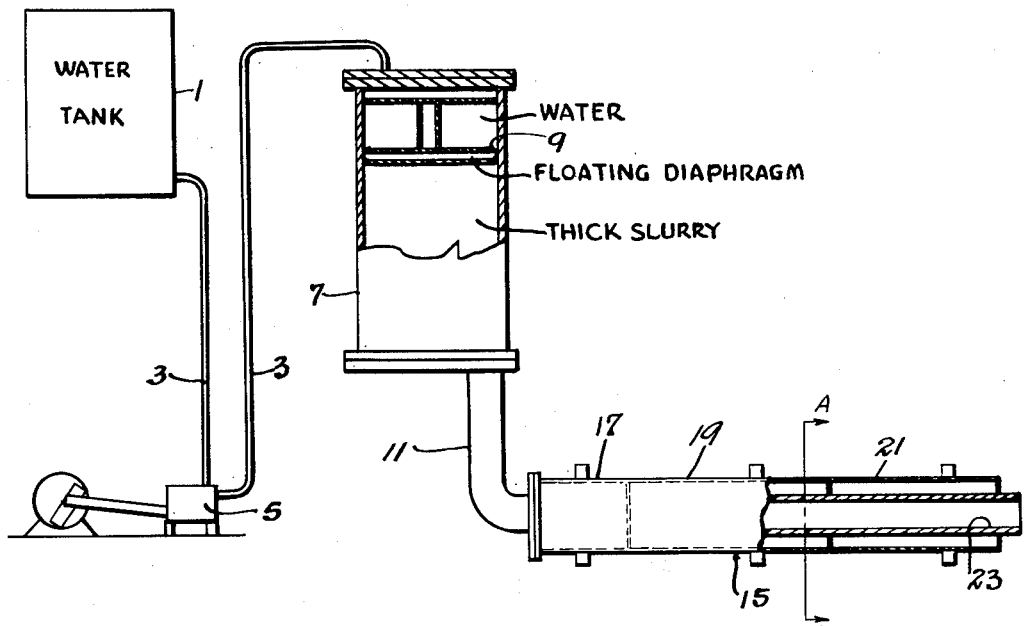

July 17, 1956          E. M. ALLEN          2,754,547

HEAT INSULATION COMPOSITION AND PREPARATION THEREOF

Filed Nov. 17, 1951

INVENTOR.
EDWARD M. ALLEN
BY
Oscar L. Spencer
ATTORNEY.

United States Patent Office 2,754,547
Patented July 17, 1956

2,754,547

HEAT INSULATION COMPOSITION AND PREPARATION THEREOF

Edward M. Allen, Wadsworth, Ohio, assignor to Columbia-Southern Chemical Corp., Allegheny County, Pa., a corporation of Delaware Application November 17, 1951, Serial No. 256,945

9 Claims. (Cl. 18—47.5)

This invention relates to a novel method of preparing heat insulation material. Prior to the present invention, it has been known that heat insulation material can be prepared by reaction of calcium hydroxide with silica in an aqueous suspension. According to the conventional method disclosed in the literature, an aqueous slurry or suspension of calcium hydroxide and silica together with a fibrous material, such as asbestos, is heated at an elevated temperature to cause reaction. Thereafter, this product is introduced into molds where heating is continued to cause the product to set and, finally, the solidified composition is further heated or "indurated" by heating the product at a superatmospheric pressure and at a temperature above the temperature at which water boils, usually in an atmosphere of steam. The resulting product is a light solid composition which has a bulk density of about 10 to 15 pounds per cubic foot.

An appreciable period of time is required to effect the reactions involved. Thus, the time during which the aqueous suspension must remain in a mold and before it has set up to a self-sustaining solid composition is relatively long. This necessarily means that a mold is in use for a long period of time during the production of a single article and where a large number of articles are required, a large number of molds must be used. Thus, the practice of such a process upon a commercial scale requires so many molds that investment costs in the process are exceedingly high.

According to the present invention, a new process has been provided whereby the time within which the aqueous suspension may be converted or set to a solid state is materially shortened, usually to a matter of but a few minutes or even less. Because of this shortened setting time, less molds are required and, in fact, it has been possible, according to the present invention, to produce heat-insulating compositions in a more or less continuous manner by extrusion through a heated die or conduit. By this means, a multiplicity of insulating blocks or slabs of flat or curved form can be produced using but a single die or mold. This permits a substantially reduced investment cost in commercial operation. In the course of this process, a new pre-set composition has been provided.

According to this invention, heat insulation is prepared in any convenient shape by heating at reaction temperature an aqueous suspension of a fibrous material, finely divided alkaline earth metal silicate, and alkaline earth metal hydroxide or oxide, the molecular ratio of $SiO_2$ to alkaline earth in the suspension (based upon the non-fibrous components) being in the range of about 1.8:1 to 1:1. The process is conducted employing finely divided, precipitated alkaline earth metal silicate having the composition $MO(SiO_2)_x$, where M is an alkaline earth metal and $x$ is a number between 2 and 4, and also having an average particle size below 0.5 micron, preferably below 0.1 micron. Calcium silicate is especially valuable for this purpose.

In the practice of such a process, the slurry or suspension, usually containing a fibrous material, such as asbestos, glass wool, glass fiber, rock wool, or the like, is heated in a mold until the suspension has set to a self-sustaining product or pre-form. Thereafter, the product is cured by heating it, usually in an atmosphere of steam, at a superatmospheric pressure and a temperature above the boiling point of water. In all cases, the superatmospheric pressure is sufficient to establish the desired temperature of cure.

The calcium silicate-calcium hydroxide slurry subjected to treatment according to the present process is especially advantageous since it does not settle from the suspension and sets or converts to a solid state upon heating for a very few minutes, for example, 5 to 10 minutes. Thus, the slurry or suspension may be supplied to one end of a heated conduit under light pressure. By continuously or intermittently supplying slurry to the entrance end of the heated conduit, the composition is forced through the conduit and solidifies to a solid composition having the contour corresponding to that of the inner cross-section of the conduit. This composition is continually moved forward by the incoming slurry and finally is discharged from the exit end of the conduit (which may be several feet long) as a solid, self-sustaining slab. Sections of this slab may be sliced off and then placed in an autoclave for further curing at superatmospheric pressure as above described.

It is important that the calcium silicate used according to this invention is of an average ultimate particle size below 0.5 micron, and preferably below 0.1 micron. An especially reactive composition which does not settle to an objectionable degree may be obtained when the calcium silicate used is prepared synthetically by a precipitation process. One advantage of the precipitated calcium silicate lies in the high degree of reactivity of the product, possibly due to its extremely fine state of division or to other causes.

An especially good calcium silicate capable of use according to this invention is prepared by reaction of the calcium salt, such as calcium chloride, with sodium silicate under vigorous agitation. One effective way to produce the contemplated calcium silicate is to introduce a flowing stream of aqueous sodium silicate solution and a flowing stream of aqueous calcium chloride solution into the central area of a centrifugal pump. In this case, the agitation of the mixture is effected as the introduced streams of reactants are thrown radially outward by the pump rotor. In practice of this process, it is found desirable to limit the feed of calcium chloride solution and sodium silicate solution to the pump to an amount below the capacity of the pump. For example, if the pump is capable of discharging 100 gallons per minute with unlimited flow of liquid to the pump, the amount of reacting solution supplied to the pump is held at least 10 per cent below, and usually 35 per cent or more below this amount. This appears to afford a greater degree of agitation of the reacting solutions and to ensure production of calcium silicate having the desired degree of fineness. Calcium chloride solutions containing approximately 5 to 150 grams per liter of calcium chloride are mixed with sodium silicate solutions containing 5 to 150 grams per liter of $SiO_2$ as sodium silicate. The sodium silicate used has the composition $Na_2O(SiO_2)_x$, wherein $x$ is a number between 2 and 4.

Following precipitation, the product is recovered by washing and filtration and/or decantation and is dried at a temperature usually approximating 100 to 125° C. Such a product is almost entirely (95 per cent or more on an anhydrous basis) calcium silicate, but may contain small amounts of magnesium oxide or magnesium silicate. The product also contains an appreciable amount (about 4 to 20 per cent) of water. Some of this water, usually ranging in a concentration of 2 to 10 per cent by weight, is apparently chemically bound to the calcium silicate in the form of water of hydration. That is, such water is not driven off by heating at 105° C. for a substantial period of time, for example, 24 hours or more. On the other hand, such water can be driven off by heating at ignition temperature.

The remaining water, usually ranging between 2 to 10 per cent by weight of the entire composition, is in the form of so-called "free" water which can be driven off by heating at a temperature, for example, 105° C., for 24 hours. Thus, the resulting product is actually hydrated calcium silicate which has the ratio of calcium oxide to $SiO_2$ approximately corresponding to the ratio of $Na_2O$ to $SiO_2$ of the sodium silicate used in the preparation of the product.

If desired, drying of the alkaline earth metal silicate may be dispensed with and the slurry of precipitated silicate used without drying. This is advantageous since drying tends to reduce the reactivity of the silicate.

It will also be understood that other finely divided precipitated calcium silicates may be used according to this invention. Thus, finely divided calcium silicate which is prepared according to U. S. Letters Patent No. 2,204,113 granted to R. P. Allen, June 11, 1940, may be used according to this invention. Moreover, salts other than calcium chloride, such as calcium nitrate or calcium acetate, may be used. Also, precipitated silicates of other alkaline earth metals, such as magnesium, strontium or barium silicates, may be used according to this invention.

In general, the ratio of silicon oxide to calcium oxide in the precipitated calicum silicate will range between 2 and 4. While some departure from this range is permissible, it is generally found that precipitated calcium silicate having this silicon oxide CaO ratio is very finely divided and highly reactive for the purpose contemplated.

In the practice of the herein contemplated process, an aqueous slurry of the calcium silicate and lime is made up. Sufficient lime is used to establish a silicon oxide to calcium oxide ratio of $SiO_2$ to CaO of at least 1.0 and preferably about 1.25 to 1.75, usually about 1.5. In general, it has been found that compositions which are prepared from suspensions in which the silicon oxide calcium oxide ratio is approximately 1.5, plus or minus 0.25, are the strongest compositions.

Sufficient water should be in the slurry to ensure effective reaction to produce the solid composition. On the other hand, if the slurry is too dilute, it will not set up. In general, the slurry should contain approximately 2 to 10 parts by weight of water per part of solids in the slurry, preferably in the range of 5 to 8 parts by weight per part of solid.

The compositions produced according to this invention normally contain asbestos or its equivalent. Sufficient asbestos normally is used to establish an asbestos concentration of 10 to 30 per cent by weight, based upon the total solids in the suspension or slurry. In lieu of asbestos, other fibrous materials may be used although asbestos normally produces the strongest product. Such other fibrous materials include rock wool, glass wool, glass fiber, etc.

The process is performed by mixing a slurry in the above proportions and heating the slurry until it sets. This may be accomplished by pouring the slurry into a mold of desired contour or by extruding the slurry through a heated conduit. In either case, the slurry is heated and after a short period of time, usually 5 to 30 minutes, it converts to a solid state. The resulting product is then removed from the mold or heated conduit and is then placed in the indurator. The temperature of heating to effect this initial conversion to solid state depends upon the rate of setting desired. The composition will set up to solid state on standing for several hours even at room temperature. Increasing the temperature increases the rate of setting and, in general, the temperature of heating should range from 150 to 212° F. Higher temperatures normally are avoided when the initial heating is conducted at atmospheric pressure. On the other hand, higher pressures can be used and, in such cases, higher temperatures of setting may be resorted to. The resulting product is a solid self-sustaining article which is cured on the surface, usually to the point where it cannot readily be indented by pressure of the thumbnail. On the other hand, the interior is somewhat softer, there being a gradually increasing degree of cure from the center outward. The central area frequently is soft and frequently is in a plastic state. This product is subjected to the final curing operation under heat and pressure. In order to avoid the use of an excessive number of molds, the product commonly is removed from the mold prior to the final conversion or induration. Similarly, if the product is extruded, the extruded product is cut into segments and transferred to the autoclave for the induration.

In the final conversion, the product is subjected to heat and pressure, usually in an atmosphere of steam. The temperature of curing normally ranges above 250° F., usually in the range of 300 to 375° F. Higher temperatures are permissible although unnecessary. The pressure which is applied normally ranges about 50 to 200 pounds per square inch. However, lower and higher pressures may be used. The pressure normally is applied by introducing the pre-set product into an autoclave and introducing steam into the autoclave at the desired pressure. However, other mechanism of establishing the desired pressure may be resorted to.

The temperature of the final cure usually is best determined by the pressure which is applied. Thus, where the pressure ranges at about 50 to 150 pounds per square inch, the final temperature normally ranges at about 300 to 375° F.

The period of induration or curing is capable of some variation. In general, a curing period of 5 or more hours is satisfactory.

It will be understood that in addition to the calcium silicate, calcium hydroxide, and fibrous material such as asbestos, other materials may be incorporated in order to increase the strength of the product, increase its rate of setting, and the like. For example, small amounts of sodium hydroxide (0.1 to 1 per cent, based upon the dry solids of the composition) may be added in order to increase the rate of setting. In like manner, other components, such as Portland cement, gypsum, and the like, may be introduced. Some silica may be introduced but should not exceed one-third of the $SiO_2$ of the calcium silicate.

Thus, the calcium silicate-calcium hydroxide should comprise the major portion of the solid non-fibrous components of the composition, preferably being in excess of 75 per cent by weight of the non-fibrous dry solids. While other components may be present, best results are obtained when additives, such as silica, Portland cement, etc., are not in excess of 20 per cent of the dry non-fibrous solids of the composition.

The following examples are illustrative:

*Example I*

Streams of aqueous sodium silicate solution containing 100 grams per liter of $SiO_2$ as $Na_2O(SiO_2)_{3.36}$, and calcium chloride solution containing 100 grams per liter of $CaCl_2$ and 30 to 40 grams per liter of sodium chloride, were fed directly into the central area of a centrifugal pump at 150° F. The rates of flow are adjusted so that the calcium chloride is 10 percent or more in excess of the stoichiometric quantity required for complete reaction, and so that the amount of liquid supplied to the pump is about 25 per cent below the output capacity of the pump. In consequence, the solutions were subjected to turbulent intermixing in the pump. The slurry of calcium silicate thus produced was washed to remove dissolved salts, and a slurry of calcium silicate having the composition $CaO(SiO_2)_{3.3}$, and containing about 10 per cent by weight of such calcium silicate, was obtained. This slurry was cooled to room temperature. From this slurry, an aqueous suspension was made up having a solids content which consisted of 68 per cent by weight of the hydrated calcium silicate, 18 per cent by weight of calcium hydroxide, and 14 per cent by weight of glass fiber, the water content being such that the suspension contained 6.6 parts by weight of water per part of solid. Such a composition contains approximately 2 moles of $SiO_2$ per mole of CaO.

In forming this suspension, the calcium silicate slurry was agitated, the lime added slowly thereto, and then the glass fibers were added and agitation continued for 3 to 5 minutes. The resulting slurry was then poured into heated molds and a ¼ inch copper tube, heated with 150 pounds per square inch steam, was inserted in the slurry for about 30 minutes to heat the slurry quickly. The mold and slurry were then placed in an oven at about 250° F. for 30 minutes. The mold was removed from the casting and the casting charged into an autoclave. In the autoclave, the casting was subjected to steam at a pressure of 140 to 160 p. s. i. in direct contact with the steam. While good products were obtained after 2 to 3 hours in the autoclave, products which were heated 4 or more hours in the autoclave were found to be definitely stronger.

The resulting product was in the form of a slab which had a bulk density of about 9.2 to 10 pounds per cubic foot.

*Example II*

Hydrated calcium silicate slurry of the type described in Example I was thickened to approximately 10 per cent solids by filtering off part of the water. Two per cent by weight of sodium hydroxide and 0.5 per cent of a detergent were added to the slurry, the desired quantity of fibers was added, and agitation was continued for about 15 to 20 minutes. An aqueous suspension in which the solids content consisted of 70 per cent hydrated calcium silicate of the type set forth above, 15 per cent by weight of calcium hydroxide, and 15 per cent by weight of glass fiber, and containing 6 parts by weight of water to one part of solids, was produced. This composition was cast in a mold as described in Example I and thereafter indurated in an autoclave in an atmosphere of steam at a steam pressure of 140 to 170 pounds per square inch.

*Example III*

Figure 2:
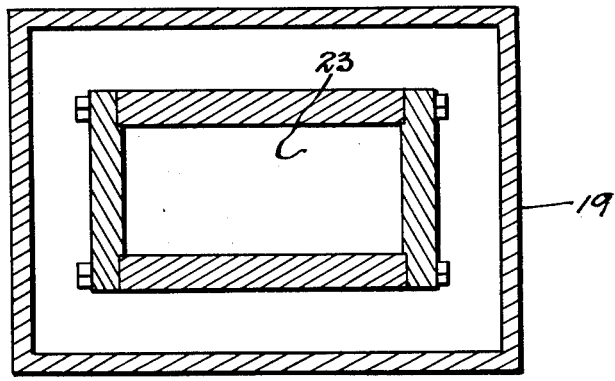

An apparatus illustrated in the accompanying drawing was used. In this drawing:

Fig. 1 is a diagrammatic drawing, partially in section, of a device used in order to practice the invention; and Fig. 2 is a section of Fig. 1 taken along lines A—A.

The illustrated apparatus comprises a water tank 1 connected by conduit 3 to the upper end of a pressure cylinder 7. A metering pump 5 is provided in line 3 in order to supply a metered amount of water to the upper end of the cylinder.

A water-tight floating diaphragm 9, which is movable up and down the interior of the cylinder, is provided in water-tight slidable contact with the interior walls of the cylinder. The bottom or exit end of the cylinder is provided with an outlet conduit 11 which transfers the calcium silicate slurry to a mold 15. This mold has a rectangular channel or passage 23 of rectangular cross-section, 4 inches by two inches and is 38 inches in length. The mold itself was constructed of one-half inch metallic iron and was provided with three heat-exchange jackets 17, 19, and 21, respectively. Each of these jackets had an independent source of heat exchange liquid. Jacket 17 was 6 inches in length and jackets 19 and 21 each were 15 inches in length.

In the practice of the process, a uniform slurry was made up by mixing 63 pounds of calcium silicate filter cake containing 18 per cent by weight of $CaO \cdot (SiO_2)_{3.3}$ (the balance being water), which had an average ultimate particle size of about 0.02 micron, with 2.5 pounds of asbestos, 2.5 pounds of hydrated lime, and 32 pounds water. This slurry was introduced into cylinder 7 and the floating diaphragm rested upon the slurry. The cylinder was closed and pressure was applied upon the diaphragm by pumping water into the cylinder through line 3. The slurry was forced into the mold and made to assume the contour thereof. Extrusion was contained by pumping water to the upper end of the cylinder 7 at pressures ranging from 10 to 30 pounds per square inch, the slurry thus being moved through the mold at the rate of 1.5 inches per minute.

As the extrusion was conducted, cooling water was circulated through jacket 17 to cool the jacket to room temperature in order to prevent the slurry from setting before it assumed the contour of the mold. Steam at atmospheric pressure was passed through jacket 19, and water at 205° F. was passed through jacket 21. The material thus obtained was sliced into segments, placed in an autoclave, and heated with steam at a pressure of 145 pounds per square inch for five hours. The resulting product had a bulk density of 14 to 16 pounds per cubic foot.

As shown in the above Example III, it is preferred to cool the entry end of the extrusion mold or at least to maintain a temperature gradient such that, while the slurry is heated to cause it to set, the setting does not occur until it has taken the contour of the mold. Cooling with water at room temperature serves to maintain the inlet end below setting temperature, usually at room temperature. However, other methods of accomplishing this result will be apparent to those skilled in the art.

Although the present invention has been described with reference to a specific type of precipitated calcium silicate, it is to be understood that other types of calcium silicate may be treated according to the present invention, with consequent production of a valuable heat insulation. For example, other calcium salts, such as calcium acetate, may be used to produce the calcium silicate, in which the ratio of $SiO_2$ to CaO exceeds about 2. Moreover, other alkaline earth metal silicates, such as magnesium silicate, barium silicate, etc., may be used in lieu of calcium silicate, calcium hydroxide, magnesium hydroxide, or like alkaline earth metal, in accordance with this invention.

Although the present invention has been described with reference to the specific details of certain embodiments thereof, it is not intended that such details shall be regarded as limitations upon the scope of the invention except insofar as included in the accompanying claims.

As has been explained above, the compositions used according to this invention may consist entirely of calcium silicate, lime, water, and fibrous material. However, other components may be present. The term "consisting essentially of," when used in the ensuing claims, is intended to include the composition recited in the claims without addition of other components, as well as compositions in which additional components are present, so long as the alkaline earth metal silicate plus alkaline earth metal oxide or hydroxide plus fibrous components constitute at least 75 per cent of the solids of the composition, and the $SiO_2$ of the alkaline earth metal silicate constitutes at least 75 per cent of the $SiO_2$ of the mixture (exclusive of fibrous $SiO_2$ such as exists in asbestos, glass wool, etc.).

What is claimed:

1. A method of preparing formed heat insulation, which comprises: mixing an aqueous suspension consisting essentially of discrete particles of chemically precipitated alkaline earth metal silicate of the composition $$MO(SiO_2)_x$$

where M is an alkaline earth metal and $x$ is a number between 2 and 4, said silicate having an average particle size below 0.5 micron, 2 to 10 parts of water per part of solid, and an alkaline earth metal hydroxide, the alkaline earth metal silicate and alkaline earth metal hydroxide being in such proportion that said suspension has a molecular ratio of SiO₂ to total alkaline earth metal oxide of 1–1.8 to 1; curing the said suspension in a forming member at a reaction temperature of at least 150° F. for a period of at least five minutes and up to about 30 minutes to impart rigidity thereto; and thereafter recovering a formed article from the forming member.

2. The method of claim 1 in which the alkaline earth metal silicate is calcium silicate and the alkaline earth metal hydroxide is calcium hydroxide.

3. The method of claim 1 in which the aqueous suspension also contains 10 to 30 per cent by weight, based on total solids, of an inert inorganic fibrous material.

4. A method of preparing formed heat insulation, which comprises: mixing an aqueous suspension consisting essentially of discrete particles of chemically precipitated alkaline earth metal silicate of the composition $MO(SiO_2)_x$, where M is an alkaline earth metal, and $x$ is a number between 2 and 4, said silicate having an average particle size below 0.5 micron, 2 to 10 parts of water per part of solid, and an alkaline earth metal hydroxide, the alkaline earth metal silicate and alkaline earth metal hydroxide being in such proportion that said suspension has a molecular ratio of SiO₂ to total alkaline earth metal oxide of 1–1.8 to 1; curing said suspension in a forming member at a reaction temperature of at least 150° F. for a period of at least five minutes and up to about thirty minutes to impart rigidity thereto; thereafter recovering a formed article from the forming member; and indurating said formed article by further heating in an environment of steam at superatmospheric pressure.

5. The method of claim 4 in which the alkaline earth metal silicate is calcium silicate and the alkaline earth metal hydroxide is calcium hydroxide.

6. The method of claim 4 in which the aqueous suspension also contains 10 to 30 per cent by weight, based on total solids, of an inert inorganic fibrous material.

7. An aqueous suspension capable of being cured in a forming member to produce a formed article by heating at a reaction temperature of at least 150° F. for a period of at least five minutes and up to about thirty minutes, consisting essentially of: discrete particles of chemically precipitated alkaline earth metal silicate of the composition $MO(SiO_2)_x$, where M is an alkaline earth metal and $x$ is a number between 2 and 4, said silicate having an average particle size below 0.5 micron; 2 to 10 parts of water per part of solid; and an alkaline earth metal hydroxide, the alkaline earth metal silicate and alkaline earth metal hydroxide being in such proportion that said suspension has a molecular ratio of SiO₂ to total alkaline earth metal oxide of 1–1.8 to 1.

8. The aqueous suspension of claim 7 in which said suspension also contains 10 to 30 per cent by weight, based on total solids, of an inert inorganic fibrous material.

9. The aqueous suspension of claim 7 in which the alkaline earth metal is calcium silicate and the alkaline earth metal hydroxide is calcium hydroxide.

References Cited in the file of this patent

UNITED STATES PATENTS

| | | |
|---|---|---|
| Re. 23,228 | Fraser | May 9, 1950 |
| 707,898 | Boas | Aug. 26, 1902 |
| 1,009,630 | Barringer | Nov. 21, 1911 |
| 2,215,891 | Thomson et al. | Sept. 24, 1940 |
| 2,326,516 | Brown | Aug. 10, 1943 |
| 2,428,555 | Cummins et al. | Oct. 7, 1947 |
| 2,432,981 | Abrahams et al. | Dec. 23, 1947 |
| 2,442,519 | Schultz | June 1, 1948 |
| 2,483,498 | Lewon et al. | Oct. 4, 1949 |
| 2,502,409 | Bour | Apr. 4, 1950 |
| 2,554,934 | Ayers | May 29, 1951 |
| 2,590,566 | Osborn | Mar. 25, 1952 |

FOREIGN PATENTS

| | | |
|---|---|---|
| 499,719 | Great Britain | Jan. 27, 1939 |

OTHER REFERENCES

Audley, J. A.: "Silica and the Silicates," Van Nostrand Co., New York, N. Y. (1921), page 110.